United States Patent [19]
Mittendorf et al.

[11] Patent Number: 4,644,744
[45] Date of Patent: Feb. 24, 1987

[54] CONTROL DEVICE FOR CONTROLLING AN ENGINE OF A TURBINE POWER SYSTEM HAVING MORE THAN ONE ENGINE

[75] Inventors: Gerald C. Mittendorf, South Bend, Ind.; Francis G. Sollman, Jacksonville, Fla.

[73] Assignee: Allied Corporation, Morristown, N.J.

[21] Appl. No.: 725,049

[22] Filed: Apr. 19, 1985

[51] Int. Cl.$^4$ .............................. F02C 6/02; F02C 9/28
[52] U.S. Cl. .................... 60/39.15; 60/39.282
[58] Field of Search ........................ 60/39.15, 39.282

[56] References Cited

U.S. PATENT DOCUMENTS

| | | | |
|---|---|---|---|
| 3,174,284 | 3/1965 | McCarthy | 60/39.15 |
| 3,200,886 | 8/1965 | Magri et al. | 60/39.15 |
| 3,307,351 | 3/1967 | Wheeler et al. | 60/39.15 |
| 3,403,507 | 10/1968 | Schuster | 60/39.15 |
| 3,600,888 | 8/1971 | Nethken et al. | 60/39.15 |
| 3,930,366 | 1/1976 | Nelson | 60/39.15 |

Primary Examiner—Louis J. Casaregola
Attorney, Agent, or Firm—Ken C. Decker; William N. Antonis

[57] ABSTRACT

A control device for controlling an engine of a turbine power system having more than one engine is disclosed. The control device includes a proportional-integral-differential (PID) controller based on power turbine speed and a signal representing the difference between the torque of the engine being controlled and the torque of another engine in the power system, if the controlled engine is generating a torque less than that of the other engine. Accordingly, the control loop used in the device inherently tends to bring the torque of the controlled engine up to the torque of the other engine while maintaining power turbine speed equal to its reference, thereby equalizing the torques without expensive electrical connections between the controls of the two engines. Overrides are provided so that fuel also may be controlled based on the maximum torque of the engine being controlled, the total torque exerted by all the engine of the power system, the power tubine temperature, or by positive or negative gas generator speed rate of changes.

11 Claims, 1 Drawing Figure

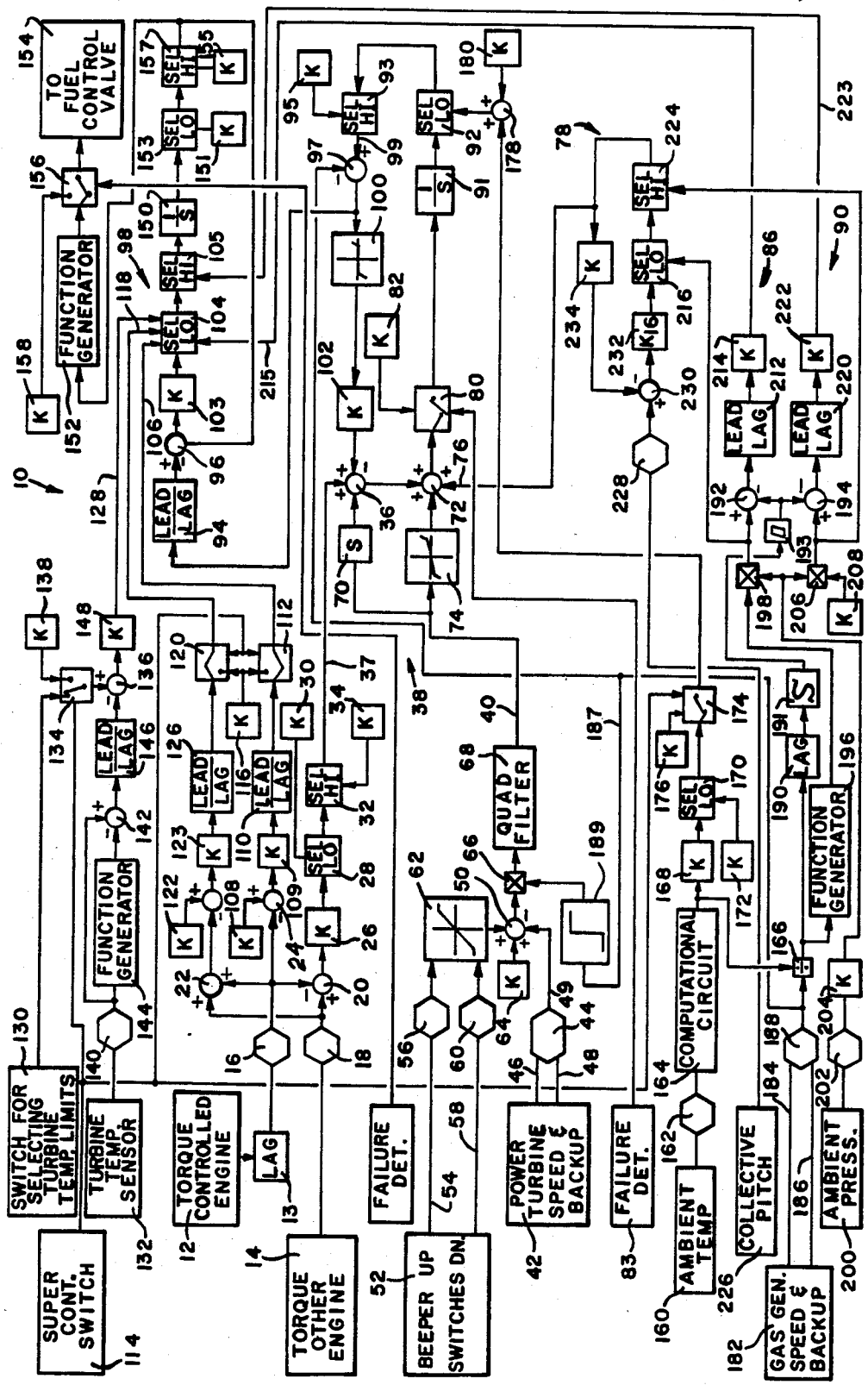

CONTROL DEVICE FOR CONTROLLING AN ENGINE OF A TURBINE POWER SYSTEM HAVING MORE THAN ONE ENGINE

Rotary winged aircraft (i.e., helicopters) are often equipped with turbine power systems having two or more engines. The engines in such a power system must be controlled interdependently, so that each of the engines exerts its fair share of the load throughout a wide range of power requirements. One such load sharing system known in the prior art is disclosed in U.S. Pat. No. 3,930,366, issued Jan. 6, 1976 to Nelson.

In general, some engine control systems use proportional control, in which fuel flow to the engine is controlled as a function of power turbine speed. Other engine control systems are of the integral control type, in which an integrating controller is used. Control systems using an integrating controller, and particularly control systems which use proportional, integral, and differential control (the so-called "PID" controller), provide much more sophisticated control of the turbine engine than does a system which simply uses proportional control. However, prior art control devices for multi-engine turbine power systems which used integral control required electrical interconnections between the controllers for the various engines, i.e., they required "cross-talk" between the controllers used to control different engines of a single power system. The required "cross-talk" between the engines was obviously undesirable, because of the inherent reliability and calibration problems.

In addition to controlling on a basis of power turbine speed, it must be assured that the power output of the engines, and of each engine, never exceeds its maximum limits. Furthermore, turbine temperature must never exceed a predetermined limit. While control is normally effected based on power turbine speed, the gas generator speed also must not accelerate above a maximum limit in order to prevent engine stall. All of these factors must be taken into account in the design of a power control system for a turbine engine.

Accordingly, one advantage of the present invention is that an integral controller is provided for a multi-engine turbine power system in which "cross-talk" between controllers operating the various engines of the turbine power system is not necessary. Another advantage of the control system provided by the present invention is that control is normally effected based on power turbine speed, but is also provided based on maximum torque outputs of each engine, along with the necessary maintenance of gas generator speed.

These and other features of the invention will become apparent from the following specification with reference to the accompanying drawing, the sole figure of which is a diagrammatic representation of a control system made pursuant to the teachings of the present invention.

Referring now to the drawing, the control system generally indicated by the numeral 10 controls fuel flow to one of the engines of a multi-engine turbine power system. The control 10 includes a torque sensor 12 which generates a signal which varies in proportion to the magnitude of the torque generated by the engine which is being controlled by the control 10. The torque signal from sensor 12 is transmitted through a conventional lag circuit 13. Another torque sensor 14 generates a signal which varies in proportion with the magnitude of the torque generated by one of the other engines comprising the turbine power system in which both of the engines share a common load. The torque sensors 12, 14 may be made as described in the aforementioned U.S. Pat. No. 3,930,366. The signals generated by the torque sensors 12, 14 are transmitted through window comparators 16, 18 which make sure that the value of the signals generated by the torque sensors 12, 14 are within prescribed limits. The torque signal from the torque sensor 12 and lag 13 is then fed to summing junctions 20, 22 and 24. Similarly, the torque signal from sensor 14 is transmitted to summing junctions 20 and 22. The signal representing the torque of the controlled engine generated by sensor 12 is subtracted from the signal representing the torque of the other engine at summing junction 20, thereby generating a difference signal representing the amount by which the torque of the controlled engine is less than the torque of the other engine. The resulting difference signal is then multiplied by a constant at 26 and then fed through select low gate 28, where the difference signal is compared with a constant signal 30. The difference signal is then fed to a select high gate 32 where it is compared with a constant 34. The constant 34 is chosen such that the signal transmitted to a summing junction 36 on line 37 has a value of zero if the torque generated by the controlled engine is equal to or greater than the torque generated by the other engine. If the torque generated by the engine controlled by the control device 10 is less than the torque generated by the other engine, the value of the signal on line 37 is a function of this difference. Constant 30 serves to prevent power turbine speed 49 from being driven beyond its requested value by three percent or whatever is chosen by the signal on line 38 as explained hereinafter. The signal value on line 37 can remain abnormally high due to failures in the torque sensors 12 and 14, etc.

The summing junction 36 is a part of a power turbine speed control loop generally indicated by the numeral 38. The power turbine speed control loop 38 includes an input line 40 through which a signal representing the speed of the power turbine of the engine controlled by the control device 10 is transmitted. A speed sensor 42, such as that described in the aforementioned U.S. Pat. No. 3,930,366, generates a signal which is transmitted to a window comparator 44 over line 46. Similarly, the power turbine speed sensor 42 includes a speed sensor backup which transmits a backup signal over the line 48 to the window comparator 44. The backup speed sensor may also be of the type disclosed in the aforementioned U.S. Pat. No. 3,930,366. The window comparator 44 assures that the signals transmitted over lines 46, 48 are within predetermined limits, and selects one of the signals, in accordance with a predetermined protocol, for transmittal to a summing junction 50.

A pair of so-called "beeper" switches are illustrated diagrammatically as at 52. As is well known to those skilled in the art, operation of the beeper switches raise or lower incrementally the power turbine speed depending upon which of the beeper switches is actuated. The "up" beeper switch transmits a signal on line 54 to window comparator 56, and the "down" beeper switch transmits a signal over line 58 to window comparator 60. A function generator 62 receives the signals from the "up" and "down" beeper switches, and generates a signal which is transmitted to the summing junction 50 to raise or lower the power turbine speed signal transmitted from speed sensor 42. The design and operation of the beeper switches and the way they operate to raise or lower the power turbine speed is described in more detail in the aforementioned U.S. Pat. No. 3,930,366. A constant 64 is also added at summing junction 50. The power turbine speed signal 49 is subtracted from the signals from constant 64 and function generator 62 at summing junction 50 to generate a difference signal representing the amount by which power turbine speed is from its reference. The output of the summing junction 50 is fed through a multiplier 66 where it is multiplied by a step function having one of two different values depending upon whether the gas generator speed is above or below a predetermined level, as will be described later. The output of summing junction 50 is then transmitted through a conventional quadratic filter 68 and then to the power turbine speed control loop 38.

Referring now to the loop 38, the signal on input 40 is differentiated by a differentiator 70 and transmitted to the summing junction 36, where it is summed with the signal from select high gate 32, which normally represents the difference in torque between the controlled engine and the other engine, if the torque of the controlled engine is less than that of the other engine. Another summing junction 72 is common with the summing junction 36. The signal on line 40 is fed through a conventional two slope gain function 74 and is then transmitted to the summing junction 72. Another signal is fed to input 76 of summing junction 72 from the collective pitch control loop generally indicated by the numeral 78 which will be described in detail hereinafter. The output of summing junction 72 is transmitted to an electronic switch 80 which is controlled by a conventional failure detection circuit generally indicated by the numeral 83. Normally, the switch 80 connects the output of the summing junction 72 with the output of the switch, but is responsive to a signal from the failure detection circuit 83 to switch the output of the switch 80 to a constant value represented by the constant 82. The output of the switch 80 is fed to an integrator 91, which integrates the signal from the switch 80. The output of the integrator 91 is fed to a select low gate 92 which compares the output of the integrator 91 with a function calculated based on the ambient temperature as will be described hereinafter. The output of the select low gate 92 is fed to a select high gate 93 which compares the output of the select low gate 92 with a constant 95. Signal 99 from the select high gate 93 is the gas generator speed request which acts to set the gas generator speed as will be described hereinafter. Constant 95 is chosen to prevent the power turbine speed 49 demands from driving the gas generator speed (as measured by sensors 182) below a minimum predetermined limit commonly called an underspeed governor set point. The gas generator speed signal as described hereinafter is subtracted from signal 99 to generate a difference signal from the output of summing junction 97. The output signal of summing junction 97 is transmitted through a lead/lag filter 94 to a summing junction 96 in a fuel control signal calculation loop generally indicated by the numeral 98. The output of the summing junction 97 is also fed back to the summing junction 36, through conventional dead band 100 and is multiplied by a constant 102. The feedback signal is subtracted from the sums of the other inputs to the summing junctions 36 and 72. Accordingly, the output of the control loop 38 will normally be a function of power turbine speed and the difference between the torque of the controlled engine and the torque of the other engine of the power system, if the torque of the controlled engine is less than the torque of the other engine. However, these components may be overridden by signals which are functions of the gas generator speed and ambient temperature.

Referring now to the fuel signal control loop 98, the output of the summing junction 96 (which subtracts the feedback signal to be described hereinafter from the signal received from the filter 94) is multiplied by a constant 103 and transmitted to a select low gate 104. An input 106 of the select low gate 104 receives a signal representing the torque of the engine being controlled by the control device 10 generated by the sensor 12 and fed to the summing junction 24, where the torque signal is subtracted from constant 108. The signal from the summing junction 24 is multiplied by constant 109 and transmitted to a conventional lead/lag circuit 110 where dynamic compensation is introduced in a conventional manner and then to a switch 112. The switch 112 normally connects the output of the lead/lag circuit 110, but is responsive to operation of a super contingency switch 114 on the pilot's control panel to switch from the output of the lead/lag circuit 110, which varies in response to changes in torque of the controlled engine, to a constant 116. As will be explained hereinafter, the super contingency switch 114, when operated, switches many of the variables upon which the control device 10 effects fuel control to relatively high constant values. In this way, the pilot has the option of sustained high power operation of the engines in emergency situations. The output of the switch 112 is then connected to the input 106.

Another input 118 of the select low gate 104 is connected to a switch 120 which is similar to the switch 112 and connects the constant 116 to the input 118 when the switch 120 is thrown by the super contingency switch 114. The input of the electronic switch 120 receives a signal from summing junction 22 which represents the sums of the torques being generated by the engines of the turbine power system. This signal is subtracted from constant 122 in a summing junction 124 multiplied by constant 123, and dynamic compensation is introduced by a lead/lag circuit 126 similar to the lead/lag circuit 110.

The other input 128 of select low gate 104 receives a signal which varies in accordance with the turbine temperature of the engine being controlled by the control device 10. Turbine temperature limits are selectable by an electronic switch 130 which provides several operating limits for pilot training. The output of switch 130 is transmitted to another electronic switch 134 which is operated by the super contingency switch 114 to switch the output of the switch 134, which is transmitted to a summing junction 136, from the output of switch 130 to another constant input represented by the constant in block 138. Turbine temperature is sensed by turbine temperature sensor 132. The turbine temperature sensor 132 is connected with a conventional window comparator 140, which tests the output of the sensor 132 to make certain that it falls within reasonable range. The output of the window comparator 140 is fed forward to a summing junction 142. The output of the window comparator 140 is also transmitted to a function generator 144 which dynamically compensates the sensed temperature by a given schedule in a conventional manner. The output of the function generator 144 is also transmitted to the summing junction 142, where it is subtracted from the other input. The output of the summing junction 142 is fed through a conventional lead/lag circuit 146 to the summing junction 136. The output of summing junction 136 is multiplied by a constant 148, and is then transmitted to the input 128 of select low gate 104. The other input 215 of select low gate is responsive to gas generator speed rate of change and will be discussed hereinafter. The output of select low gate 104 is fed to select high gate 105 and is compared to a signal 223 which is also responsive to gas generator speed rate of change, as will be discussed hereinafter.

The output of select high gate 105 is integrated in an integrator 150. The output of the integrator 150 is fed to select low gate 153 and is compared to constant 151 which establishes a predetermined maximum limit on the integrator 150 output. The output of select low gate 153 is fed to gate 157 and is compared to constant 155 which establishes a predetermined minimum limit on the integrator 150 output. The output of the select high gate 157 is fed back to the summing junction 96. The output of the select high gate 157 is also fed to a function generator 152, which generates an output based on the output of select high gate 157 which controls fuel flow to the engine, as indicated diagrammatically by the fuel control valve 154. The output of function generator 152 is fed through an electronic switch 156, which is controlled by the super contingency switch 114 to switch from the output of the function generator 152 to a fixed constant K as indicated in block 158. The function generator 152, as well as all other function generators used in the control system 10 may be implemented in any conventional way well known to those skilled in the art, such as a look-up table (with interpolation routines as necessary) stored in memory.

The inputs to the select low gate 104 and select high gate 105 of the fuel signal control loop 98, which are a function of the gas generator speed, gas generator speed rate of change, ambient pressure, and ambient temperature, will now be described. Ambient temperature is sensed by the ambient temperature sensor 160, the output of which is transmitted through window comparator 162 and operated on by computational circuit 164. The computational circuit 164 computes the square root of the ratio of the absolute ambient temperature over a standard temperature to form a corrected temperature parameter required for scheduling purposes. Using corrected temperature for scheduling is well known to those skilled in the art. The corrected temperature from circuit 164 is fed to a divider 166 and is also multiplied by a constant 168, and is then fed through a select low gate 170 which selects the lower of the output of the block 168 and a constant 172. The output of select low gate 170 is transmitted to an electronic switch 174 which is operated by the super contingency switch 114 to select between the output of select low gate 170 and a constant represented by block 176. The output of the switch 174 is transmitted to a summing junction 178 where it is summed with a constant 180, the resultant of which is transmitted to the select low gate 92 of the turbine speed control loop 38. The select low gate 92 acts to limit gas generator speed request below a maximum value which is a function of ambient temperature.

The speed of the gas generator turbine is measured in much the same way as the speed of the power turbine is measured by speed sensor and backup 42. The gas generator speed transducer and backup transducer is generally indicated by numeral 182 and generates signals which should normally be the same on the input lines 184, 186. These signals are tested by window comparator 188, which generates an output signal 187 according to a predetermined protocol that is to be taken as representative of the gas generator turbine speed. This signal 187 is fed to summing junction 97 of the power turbine control loop 38. This signal 187 is also transmitted to a step function generator 189 which generates a signal at a lower predetermined value when the gas generator speed sensed by sensors 182 is less than a predetermined speed and a higher value when gas generator speed is above the predetermined speed. The output of function generator 189 is transmitted to multiplier 66 which acts to change the gain or sensitivity of power turbine speed difference signal 40 sent to the power turbine speed control loop 38. The output of window comparator 188 is also transmitted to divider 166 where it is divided by the signal representing corrected ambient temperature. The output of the divider 166 is fed through a lag circuit 190 and differentiator 191 which outputs a signal proportional to gas generator speed rate of change. The output of differentiator 191 is fed to a hysteresis function generator 193 and is then transmitted to summing junctions 192, 194. The output of the divider 166 is also transmitted to a function generator 196, which generates an output signal in response to its input in a predetermined manner. The output of function generator 196 is transmitted to a multiplier 198, where it is multiplied with a function representative of ambient pressure. The output of multiplier 198 is the scheduled gas generator speed acceleration limit.

Ambient pressure is sensed by a sensor 200, the output of which is transmitted through window comparator 202 and multiplied by a constant in box 204 and is then transmitted to the multiplier 198 and to another multiplier 206, where the ambient pressure function is multiplied by a constant represented by constant 208. The output of the multiplier 198 is fed to the summing junction 192 where the signal from the differentiator 191 and hysteresis function generator 193 is subtracted from the signal from the output of the multiplier 198. The resultant difference signal representing gas generator speed acceleration error is then transmitted through conventional lead/lag compensation 212 and multiplied by a constant 214 to generate signal 215. This signal 215 is then fed to select low gate 104 of the fuel signal control loop 98. The output of multiplier 198 is also fed to select low gate 216 which is a portion of the collective pitch control loop 78 which will be described in detail hereinafter. The output of multiplier 206 is the scheduled gas generator speed deceleration limit and is operated on similar to that from multiplier 198. The signal from multiplier 206 is transmitted to the summing junction 194, where a signal representative of gas generator speed rate of change transmitted through hysteresis 193 is subtracted therefrom. The resultant is fed through conventional lead/lag compensation 220 and is multiplied by a constant 222. The resultant is fed to the select high gate 105 of the fuel signal control loop 98. The output of multiplier 206 is also transmitted to one input of a select high gate 224 in the collective pitch control loop 78.

Collective pitch is measured by a transducer indicated schematically by the numeral 226 in a manner set forth in the aforementioned U.S. Pat. No. 3,930,366. The signal transmitted from transducer 226 is tested by a window comparator 228 and then fed to a summing junction 230, where a feedback signal is subtracted from the collective pitch signal, the resultant of which is multiplied by a constant 232. The resultant is then transmitted through the select low gate 216, and the output thereof is transmitted to the select high gate 224. The output of select high gate 224 is transmitted to the summing junction 72 in the power turbine speed control loop 38. This quantity is also multiplied by a constant represented by constant 234 and then fed back to the summing junction 230, where it is subtracted from the output of the window comparator 228 as described hereinabove.

It will be noted that the system described hereinabove includes several function generators. These function generators are stored, in general, as look-up tables in a microprocessor memory, such that a predetermined output is generated for a predetermined input signal, with interpolation between values if necessary. Since the values stored therein are derived, often empirically, it is impossible to describe the function generators in more detail. One skilled in the art will readily appreciate that the system must be built and calibrated and the empirical values stored in the function generator memories.

In operation, the power turbine speed control loop 38 generates an output signal which is transmitted to the fuel signal control circuit 98. The control circuit 98 generates a signal which controls a fuel control valve to control the speed of the engine. The power turbine speed control loop 38 has, for its principle input, a signal representing power turbine speed generated by sensors 42, as modified by operation of the beeper switches 52. However, the control loop 38 has additional inputs, including the input from line 37 which represents the difference between the torques generated by the other engine in the power system and the engine being controlled by the control device 10, if the torque generated by the controlled engine is less than the torque generated by the other engine. Accordingly, the signal to the circuit 98 generated by the power turbine speed control loop 38 is not only a function of turbine speed, but also is a function of the aforementioned torque differences. Accordingly, the control signal generated by the loop 38 will tend to bring the torque of the controlled engine up to the torque generated by the other engine. Note that when the torque of the controlled engine is increased excess power results and drives the power turbine speed 49 common to the controlled and other engine above its reference. The increase in power turbine speed causes the other engine to decrease its torque via the power turbine control loop down to the torque generated by the controlled engine, assuming the control devices are the same for both engines. Note the other engine's power turbine loop is not a function of torque when the controlled engine's torque is below the other engine's torque. Assuming that the other engine of the power system is controlled by control device similar to the control device 10, that control device will tend to bring the torque of the other engine up to the torque of the engine controlled by the fuel control device 10 if that engine is exerting a torque less than the torque generated by the engine controlled by the device 10. Accordingly, the control device 10 inherently generates signals tending to equalize torques between the engines and maintain control of power turbine equal to its reference. Since the power requirements of the engine will also be affected by the pitch of the rotor blades, a signal representing the pitch of the rotor blades is also fed into the control loop 38, so that the control loop 38 tends to anticipate the power requirements of the engine based also on collective pitch. The control loop 38 is also responsive to changes in turbine speed due to acceleration or deceleration of the power turbine, due to the differentiator 70. Accordingly, the signal provided to the fuel control circuit 98 is also anticipatory of power changes due to acceleration and deceleration of the power turbine.

While control of the engine is normally effected based upon power turbine speed, the difference in torques between the controlled engine and the other engine, and collective pitch, it is necessary at times to override these controls to maintain the gas generator at a speed sufficient to provide a sufficient mass flow through the engine and to prevent overspeeding. Accordingly, a signal is supplied to the select low gate 92 which is a function of ambient temperature and super contingency switch and to select high gate 93 which is a constant. Accordingly, select high gate 93 overrides the control loop 38 to prevent the speed of the gas generator turbine from dropping too low, and select low gate 92 overrides the control loop 38 to prevent the gas generator turbine from overspeeding. Since the maximum speed required of the gas generator turbine will vary pursuant to changes in ambient temperature, the signal representing the maximum speed of the gas generator turbine is modified by inputs from ambient temperature sensor 160.

While it is normally desirable to control fuel flow as a function of the parameters transmitted to the power turbine speed control loop 38, it is necessary to override control by the loop 38 under certain circumstances. Accordingly, the select low gate 104 has inputs in addition to that from the loop 38. For example, the input 106 receives a signal which varies as a function of the torque of the controlled engine as sensed by the torque sensor 12, so that the engine being controlled by control device 10 is limited. Similarly, the input 118 is connected to the summing junction 22 in which the torques exerted by both of the engines of the power system are summed, so that the total torque generated by the engines is limited. Furthermore, the input 128 of the select low gate 104 provides an override based on power turbine temperature. The power turbine temperature therefore is prevented from exceeding its limit. In addition, input 215 of the select low gate 104 provides an override based on increasing gas generator speed rate of change to prevent surge of the gas generator compressor. Since surge conditions of the gas generator compressor will vary pursuant to changes in ambient temperature and pressure and gas generator speed, the increasing gas generator speed rate of change error signal 215 is modified by gas generator speed and ambient temperature and ambient pressure. Likewise in similar fashion as signal 215 signal 223 to select high gate 105 provides an override based on decreasing gas generator speed rate of change.

We claim:

1. Control device for controlling an engine of a turbine power system having more than one engine comprising first torque measuring means for generating a primary torque signal which varies as a function of the torque generated by the controlled engine, second torque measuring means for generating a secondary torque signal which varies as a function of the torque generated by one of the other engines of said power system, means for subtracting the secondary torque signal from the primary torque signal to form a difference signal, said controlled engine having a power turbine, means for generating a speed signal proportional to the speed of the power turbine, means for generating a summing signal as a function of the sum of said speed signal and said difference signal, means for generating a control signal as a function of the summing signal, said control signal generating means including means for integrating a difference signal which varies as a function of the difference between said summing signal and a feedback signal which varies as a function of said control signal, and means responsive to said control signal for controlling fuel flow to said controlled engine under predetermined conditions.

2. Control device for turbine power plant as claimed in claim 1, including means for generating a differential signal which varies as a function of the time differential of said speed signal, said summing signal being generated as a function of said differential signal.

3. Control device as claimed in claim 1, wherein said system includes means for summing said primary and secondary torque signals and subtracting the result from a first reference signal of predetermined value to generate a first difference signal, and selecting means for selecting between said control signal and said first difference signal to control fuel flow to said one engine.

4. Control device as claimed in claim 3, wherein said system includes means for generating a second difference signal as a function of the difference between the primary torque signal and a second reference signal of predetermined value, said selecting means selecting between said first difference signal, said second difference signal and said control signal to control fuel flow to said one engine.

5. Control device as claimed in claim 4, wherein said system includes means for generating a turbine temperature function signal as a scheduled function of the temperature in said power turbine, said selecting means selecting between said first difference signal, said second difference signal, said control signal and said turbine temperature function signal to control fuel flow to the one engine as a function of one of said first difference signal, said second difference signal, said control signal or said turbine temperature function signal.

6. Control device for controlling an engine of a turbine power system having more than one engine, comprising first torque measuring means for generating a primary torque signal which varies as a function of the torque generated by the controlled engine, secondary torque measuring means for generating a second torque signal which varies as a function of the torque generated by one of the other engines of said power system, means for generating a first difference signal which varies as a function of the difference between said primary and secondary torque signals, means for generating a second signal which varies as a function of the sum of said primary and secondary torque signals, said controlled engine having a power turbine, and means for generating a control signal as a function of said first difference signal and a signal which varies as a function of the speed of said power turbine, and means for selecting between said control signal and said second signal to control fuel flow to said one engine.

7. Control device as claimed in claim 6, wherein said system includes means for generating a third difference signal which varies as a function of the difference between said primary torque signal and a fixed reference signal, said selecting means selecting between said control signal, said second signal and said third difference signal to control fuel flow to said controlled engine.

8. Control device as claimed in claim 7, wherein said system includes means for generating a turbine temperature function signal as a scheduled function of the temperature in said power turbine, said selecting means selecting between said control signal, said second signal, said third difference signal, and said turbine temperature function signal to control fuel flow to said controlled engine.

9. Control device as claimed in claim 8, wherein said selecting means selects the smallest of said control signal, said second signal, said third difference signal and said turbine temperature function signal.

10. Control device as claimed in claim 8, wherein said one engine includes a gas generator turbine, means for generating a gas generator speed signal as a function of the speed of the gas generator turbine, and means responsive to said gas generator speed signal to maintain said control signal between predetermined levels, said predetermined levels varying as a function of the gas generator speed signal.

11. Control device as claimed in claim 6, wherein said one engine includes a gas generator turbine, means for generating a gas generator speed signal as a function of the speed of the gas generator turbine, and means responsive to said gas generator speed signal to maintain said control signal between predetermined levels, said predetermined levels varying as a function of the gas generator speed signal.

* * * * *